United States Patent [19]

Astier et al.

[11] Patent Number: 4,500,280
[45] Date of Patent: Feb. 19, 1985

[54] VIBRATION-AIDED FEED DEVICE FOR A MOLDING APPARATUS

[75] Inventors: Jean-Francois Astier, Boisseuil Feytiat; Louis Bessaguet, Limoges; Michel LaPlanche, Feytiat, all of France

[73] Assignee: Legrand, Limoges, France

[21] Appl. No.: 513,385

[22] Filed: Jul. 13, 1983

[30] Foreign Application Priority Data

Jul. 13, 1982 [FR] France .................. 82 12279

[51] Int. Cl.³ ................... B29F 1/03; B29C 11/00
[52] U.S. Cl. .................... 425/569; 425/174.2; 425/456
[58] Field of Search ............ 425/432, 456, 568, 569, 425/174.2, 567; 264/23

[56] References Cited

U.S. PATENT DOCUMENTS

| | | | |
|---|---|---|---|
| 2,296,296 | 9/1942 | Shaw | 264/328.15 |
| 2,717,474 | 9/1955 | Barradell-Smith | 264/23 |
| 2,738,173 | 3/1956 | Massa | 264/23 |
| 3,233,012 | 2/1966 | Bodine | 425/174.2 |
| 3,246,055 | 4/1966 | Pendleton | 264/23 |
| 3,376,179 | 4/1968 | Balamuth | 264/23 |
| 3,456,295 | 7/1969 | Torigai et al. | 425/174.2 |
| 3,677,682 | 7/1972 | Putkowski | 425/567 |
| 3,752,620 | 8/1973 | Renoux | 425/174.2 |
| 4,017,237 | 4/1977 | Webster | 425/174.2 |

FOREIGN PATENT DOCUMENTS

| | | | |
|---|---|---|---|
| 2352678 | 4/1975 | Fed. Rep. of Germany | 425/174.2 |
| 134052 | 2/1979 | Fed. Rep. of Germany | 264/23 |
| 2744551 | 4/1979 | Fed. Rep. of Germany | 425/568 |
| 138523 | 11/1979 | Fed. Rep. of Germany | 264/23 |
| 1041108 | 10/1953 | France | |
| 2110497 | 6/1972 | France | |
| 2486861 | 1/1982 | France | |
| 2490548 | 3/1982 | France | |
| 45-39954 | 12/1970 | Japan | 425/174.2 |
| 42637 | 4/1981 | Japan | 264/23 |
| 1105566 | 3/1968 | United Kingdom | 425/174.2 |
| 386977 | 5/1972 | U.S.S.R. | 264/23 |

Primary Examiner—Willard E. Hoag
Attorney, Agent, or Firm—Charles A. Brown

[57] ABSTRACT

A vibration-aided feed device is operatively disposed between an injection head and a mold. A feed channel is provided between the injection head and the mold for the flow of the plasticized molding material to the mold. A part of the feed channel is defined by a distribution channel running through a connecting body. A vibrating arm extends laterally from the connecting body and a vibration generator is coupled to the vibrating arm. The resulting vibrations imparted to the plasticized molding material improves the flow and distribution of the molding material and the quality of the ultimate molded article.

27 Claims, 7 Drawing Figures

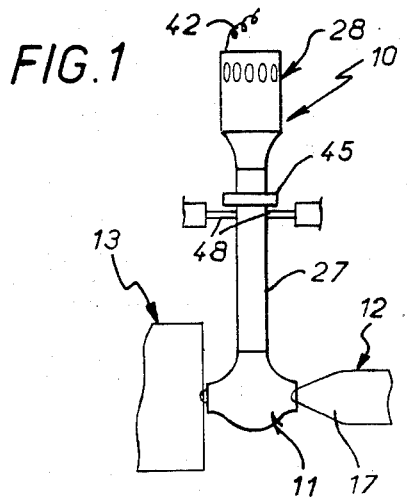
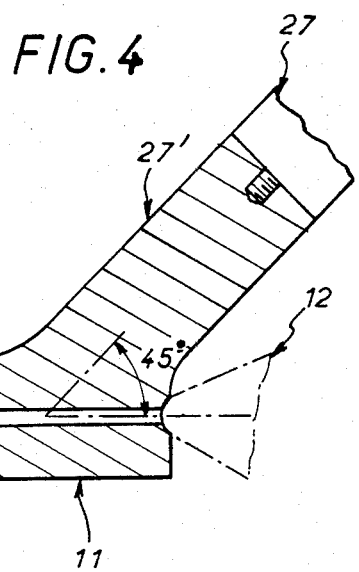
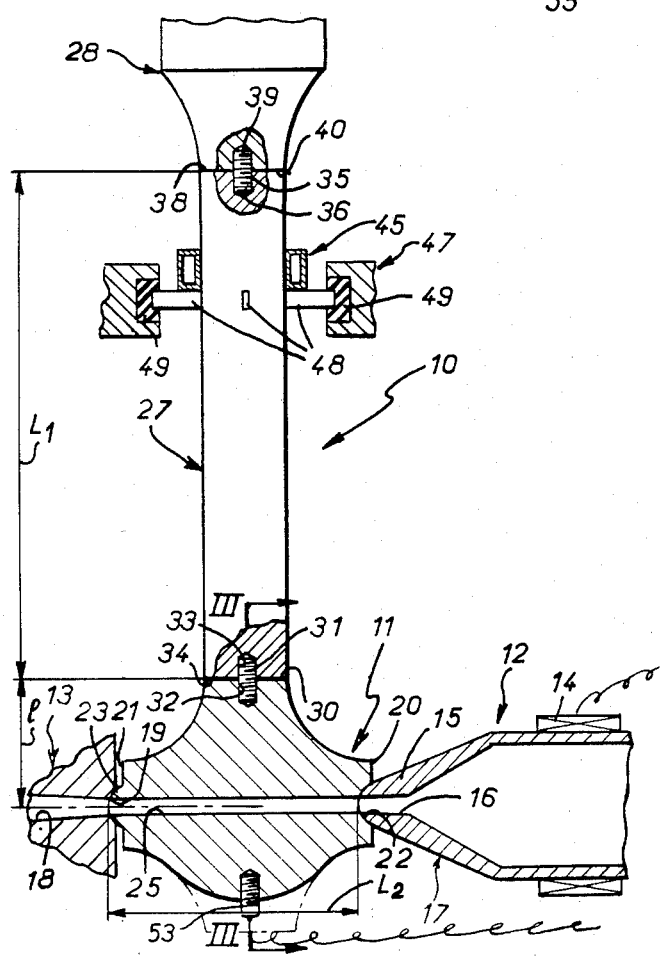
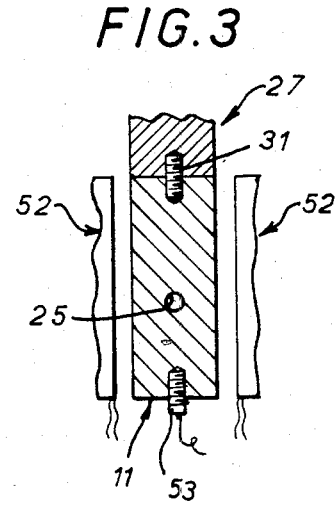

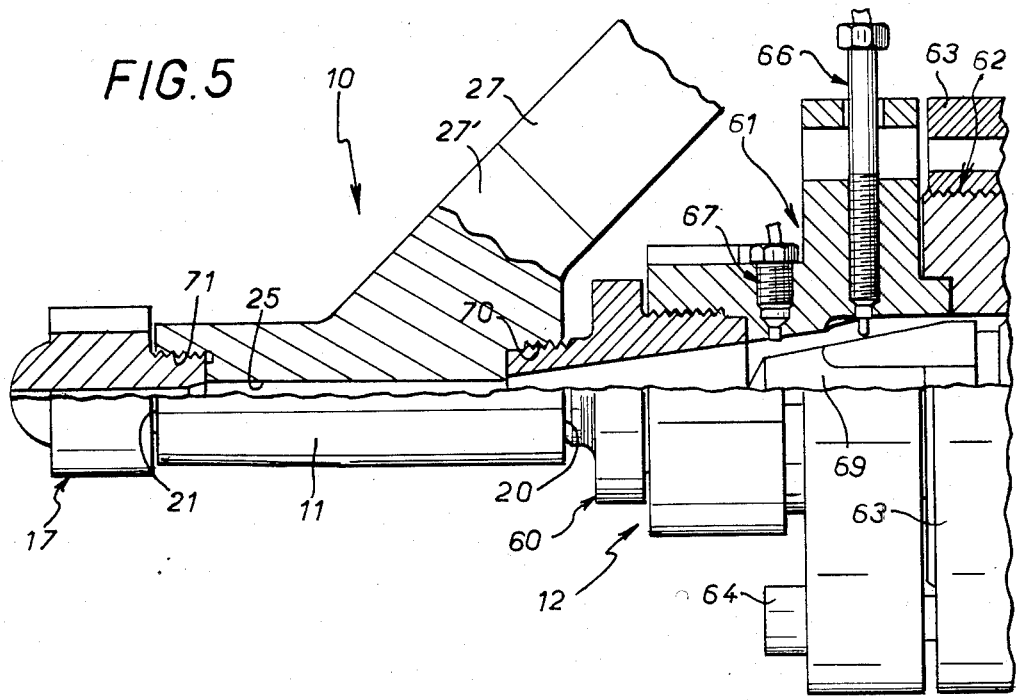
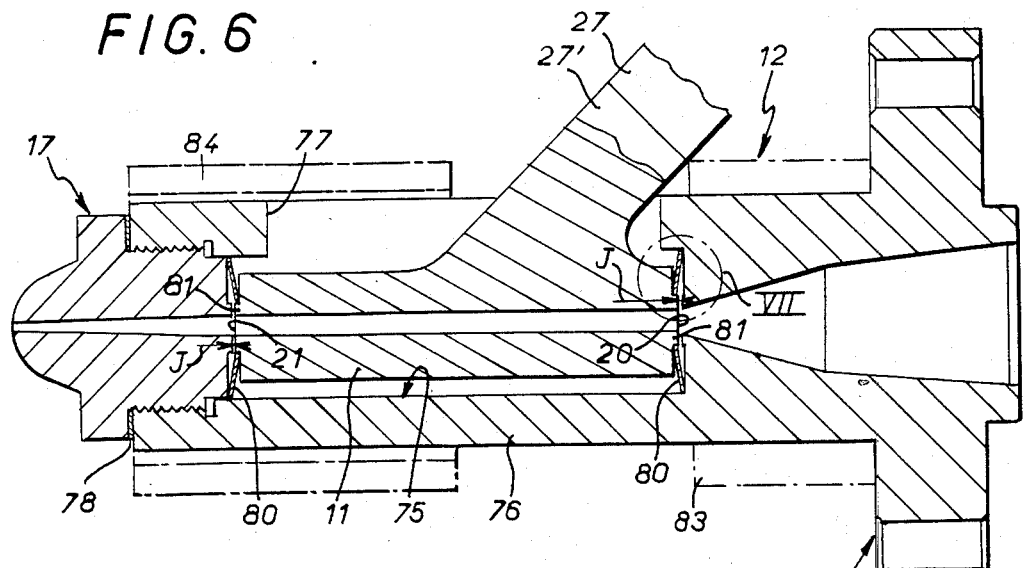
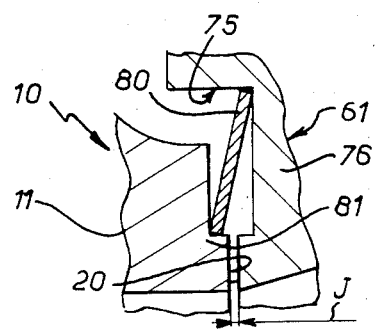

VIBRATION-AIDED FEED DEVICE FOR A MOLDING APPARATUS

BACKGROUND OF THE INVENTION

The present invention relates generally to molding all sorts of materials and more particularly to those synthetic materials known as plastics, whether or not they contain any ancilliary material such as a filler or reinforcing material.

In molding apparatus generally comprising a nozzle and at least one mold to be supplied, the molding material is heated to an elevated temperature in order to plasticize or even liquefy the molding material and then the melt or plasticized molding material is introduced, in practice under pressure, into the mold, taking into account any shrinking during curing, and thereafter the molded material is cooled to reach a sufficiently solid state so that it may retain its molded configuration after unmolding.

In practice, temperature and pressure are employed to give sufficient fluidity to the molding material to enable it to flow through the gate of the mold under satisfactory conditions and then come into intimate mating contact with the cavity of the mold under even more satisfactory conditions. To increase fluidity normally either the pressure or the temperature has to be increased. An increase in the temperature of the molding material is inevitably costly, particularly when the heated molding material has to be subsequently cooled. As for increasing the pressure it is frequently difficult to achieve without considerably complicating the entire apparatus and therefore it is also expensive. Further, whether increasing the temperature or the pressure energy consumption is high.

Under these circumstances it is not unusual, during the cooling of the molding material, notably when it contains fillers or reinforcing materials, for example, glass or carbon fibers, to find in the resulting molded articles, zones of weakness due to a poor distribution of the material and/or premature cooling thereof, sunk spots or voids in the molded material. The zones of weakness, sunk spots or voids, have a tendency to be more common in thin walls, webs and areas of complex configuration which the molded article may include. There is frequently a substantial proportion of rejects of such molded articles.

BRIEF DESCRIPTION OF THE PRIOR ART

To overcome these drawbacks French patent publication No. 2,490,548 proposes applying vibrations to the molding material during molding, by arranging, between the nozzle of the molding apparatus and the mold(s) to be supplied thereby, a vibration-aided feed unit comprising a body, referred to as a connecting body which forms a spacer and comprises an internal feed channel adapted to bring the mold cavity into communication with the injection head. In this French patent publication, however, the connecting body itself forms an energizing member and to this end comprises a heavy magnetic circuit which being made of material having a very high coefficient of hysteresis and having high Foucault current losses is subjected to the action of an alternating inductive current. Various drawbacks follow.

First of all, such a connecting body must be of considerable size which makes it difficult to insert between the injection head and the mold(s) of a conventional molding apparatus, and therefore practically precludes use on preexisting equipment. Further, the energization frequency which is linked to the frequency of the supply network is necessarily relatively low, less than 1 kHz in any event. Conjointly, the amplitude of the resulting vibrations is relatively high. The combination of a relatively low frequency and a relatively high amplitude inevitably leads to the equipment being subjected to very high mechanical stresses which jeopardizes its overall service life. Finally, the power requirements are necessarily high, and in any event greater than 10 kW in the case of molding parts of average size.

SUMMARY OF THE INVENTION

A general object of the invention is the provision of a device which enables the foregoing drawbacks to be obviated.

According to the invention there is provided a vibration-aided feed device for a molding apparatus of the type adapted and at least one mold thereof. The vibration-aided feed device comprises a so-called connecting body having a distribution channel which forms at least a part of a feed channel adapted to bring the injection head into communication with the mold. The vibration-aided feed device associated with the connecting body comprises a lateral energizing or vibrating arm coupled to a vibration generator. According to another aspect of the invention there is provided a molding apparatus having vibration-aided feed device.

Owing to the lateral arrangement of the vibrating or energizing arm associated with the connecting body which permits the corresponding vibration generator to be disposed laterally, the connecting body advantageously is compact and all the more so as the connecting body is "tuned" to the frequency of the vibrations transmitted by the vibrating arm and the frequency itself is higher.

The location of such a connecting body between the injection head of the molding apparatus and the mold(s) to be supplied is thus facilitated. Advantageously the connecting body can be mounted on existing equipment. In any event, the connecting body may be located between the injection head of the molding apparatus and the mold, or even within the injection head or the mold.

Also, in any event, the vibration generator may be a transducer which is adapted to deliver mechanical vibrations in response to electric pulses, and preferably, the transducer is an ultrasonic transducer.

The amplitude of vibrations to which the molding material is subjected along the melt pathway is advantageously very low while being sufficient to reduce points of contact and therefore frictional forces between the material and the walls confining the same, and on the other hand, to increase, locally, the temperature in constriction zones. The filling of the mold is therefore improved.

Other conditions, notably of temperature and pressure being equal, the resulting molded parts therefore have, owing to the vibration-aided feed device according to the invention, a more uniform appearance and a more homogeneous structure and the likelihood of zones of lesser strength and/or voids or sunk spots is considerably reduced, or even eliminated, and the more so as the initial temperature of the melt can be reduced. The proportion of rejects is therefore also reduced.

In conjunction therewith, the mechanical stresses to which the equipment is subjected are very low, or even nonexistent and the power requirements, including that which is necessary for additional heating means, are relatively low, for example, in all cases less than 10 kW.

In sum, the vibration-aided feed device enables the molding conditions to be improved at reduced cost.

It has, to be sure, been proposed in U.S. Pat. No. 4,017,237, to employ ultrasounds in a molding apparatus. But, the ultrasounds are not used to aid the flow of the melt as is the case with the present invention.

On the contrary, the ultrasounds are provided for sequentially gating the mold cavities: to permit the flow of plastics sequentially into the mold cavities.

Such ultrasonic gating rapidly heats the plastic which means not insubstantial energy consumption. Further, in this patent a transducer is employed which is simply affixed to a block on the surface of which is a groove for the incoming flow of plastic to be molded. In the present invention, on the contrary, the ultrasonic vibrations aid the flow of the melt through the channel in the connecting body toward the mold.

BRIEF DESCRIPTION OF THE DRAWINGS

These and other advantages of the invention will become apparent from the description which follows, given by way of example, with reference to the accompanying schematic drawings.

FIG. 1 is a partial side elevational view of a molding apparatus having a vibration-aided feed device according to the invention;

FIG. 2 is an enlarged side elevational view of the molding apparatus having the vibration-aided feed device with parts cut away;

FIG. 3 is a cross-sectional view taken on line III—III in FIG. 2;

FIG. 4 is a view, on a different scale, similar to that of FIG. 2, for an alternative embodiment;

FIG. 5 is a part elevational and part sectional view, on a different scale, similar to that of FIG. 2, for a variation of carrying out the invention;

FIG. 6 is a longitudinal sectional view, also similar to FIG. 2, for yet another modified embodiment of the invention; and FIG. 7 is an enlarged detailed sectional view of the portion included within the phantom-line area VII in FIG. 6.

DETAILED DESCRIPTION OF THE PREFERRED EMBODIMENTS

As illustrated in the drawings, and more particularly in FIG. 1, the vibration-aided feed device 10 according to the invention is adapted to be operatively disposed between a feed or injection head 12 of any kind of molding apparatus or machine and at least one mold 13 to be supplied thereby. Such a feed or injection head 12 and such a mold 13 are well known per se and as they are not in themselves essential parts of the invention need not be described in greater detail.

In the embodiment illustrated in FIGS. 1 and 2 the feed or injection head 12 is assumed to be a mere injection nozzle 17. In fact, in this embodiment, the vibration-aided feed device comprises a so-called connecting body defining a spacer member and is simply inserted between the injection head 12 and the associated mold 13. As illustrated the injection nozzle 17 is embraced by a heating band 14. In this embodiment the tip of the end 15 of the nozzle 17 which of course has an axial injection channel 16, is generally convex.

In conjunction therewith the mold 13 has a cup-shaped indentation 19 at the entrance or gate of its feed channel 18 of concave configuration complementary to that of the tip of the injection nozzle 17.

Accordingly, in the illustrated embodiment, the transverse end faces 20, 21 of the connecting body or bush 11 by which the latter is adapted to be inserted between the injection head 12 and the mold 13, are generally planar and parallel to each other. In the middle of each of the planar transverse end faces 20, 21 is a zone of particular configuration adapted to that of the associated tip of the injection nozzle 17 or the entrance or gate of the feed channel 18 of the mold 13. The middle of end face 20 thus has a cup-shaped zone 22 of concave configuration complementary to that of the tip of the injection nozzle 17, and the middle of the opposite planar transverse end face 21 has a boss 23 of convex configuration complementary to that of the cup-shaped indentation 19 at the entrance of the feed channel 18 of the mold 13. The shape of boss 23 is therefore a negative replica of that of the cup-shaped indentation 22.

In any event, from the cup-shaped indentation 22 to the boss 23 the connecting body or bush 11 has a distribution channel 24 which is adapted to provide the necessary communication between the injection head 12 and the mold 13.

According to the invention the vibration-aided feed device 10 comprises a lateral energizing or vibrating arm 27 coupled to a vibration generator 28. The vibrating arm 27 extends generally transversely with respect to the distributing channel 25 of the connecting body 11 and more precisely with respect to the axis of the distributing channel 25 which is straight.

In the embodiment illustrated in the drawings the vibrating arm 27 extends perpendicularly to the axis of the distribution channel 25 and is joined to the connecting body 11 by a side face 30 perpendicular to the end faces 20, 21.

The vibrating arm 27 is fixed to the connecting body 11 by a captive stud 31, as shown, threadedly engaging a tapped blind bore 32 in the middle of the side face 30 and a tapped blind bore 33 in the middle of the corresponding end 32 of the vibrating arm 27.

Also, as shown, the vibration generator 28 is mounted on the vibrating arm 27 at the end thereof remote from the connecting body 11 by a captive stud 35 which threadedly engages a tapped blind bore in the middle of the corresponding end 38 of the vibrating arm 27 and a tapped blind bore in the middle of the end portion 40 of the vibration generator 28.

The vibration generator 28 is preferably a transducer adapted to provide mechanical vibrations in response to electric pulses, and more particularly an ultrasonic transducer. Such an ultrasonic vibration generator is well known per se and as its features are not part of the present invention it will not be described in detail herein. For example, the vibration generator may be of the kind sold by Branson.

Vibration generators having a frequency equal to 20 kWz or 40 kHz have been found to be satisfactory. Such frequency levels should not, however, be considered to limit the scope of the present invention.

In any event, the vibration generator 28 must be connected by wiring 42 to some kind of electric pulse generator (not shown) for energizing the vibration generator.

Preferably, the connecting body 11 and the vibrating arm 27 are tuned to the same frequency. To this end the length of the vibrating arm 27 measured between the connecting body 11 and the vibration generator 28 at the corresponding interfaces 30, 34 and 38, 40 is preferably equal to n times the half-wavelength of the vibration generator 28, where n is an integer greater than one. In association therewith the "half width" of the connecting body 11 measured between the axis of the distribution channel 25 and the interface 30, 34 between the vibrating arm 27 and the connecting body 11 is preferably equal to one-quarter of the wavelength of the vibration generator 28. This ensures that with respect to the vibration generator 28 the middle part of the distribution channel 25 of the connecting body 11 is in the nodal zone i.e., a vibration node of vibrations generated by vibration generator 28.

Consequently the length of the connecting body 11 measured parallel to the axis of its distribution channel 25 between the end faces 20 and 21 at the locations of the corresponding cup-shaped indentation 22 and the boss 23 is preferably equal to n times the half-wavelength of the vibration generator 28, n being a whole number greater or equal to one, and preferably equal to one to limit the axial dimension of the assembly.

This arrangement ensures that the melt transfer zones from the injection head 12 to the connecting body 11 and from the connecting body 11 to the mold 13, which are critical zones, are advantageously antinodal zones relative to the vibration generator 28. In this connection it should be noted that the propagation of ultrasonic waves is in practice unaffected by any bends or changes in direction for the corresponding axis of propagation.

In any event, owing to the complementarity of the configurations of the transverse end faces 20, 21, the connecting body 11 advantageously has masses identical to the corresponding antinodal zones which is favorable to its acoustic tuning with respect to the vibrations.

In practice the vibrating arm 27 is a simple bar, of square cross-section for example, of the desired length. The vibrating arm 27 is preferably made of a material having good mechanical vibration transmission properties to aid the performance of the device and on the other hand good heat insulating properties to protect the vibration generator 28 from the high temperature melt. Titanium has been found to be satisfactory.

If desired, in order to further reduce heat transfer from the connecting body 11 to the vibration generator 28 cooling means, such as the illustrated cooling ring 45, may be associated with the vibrating arm 27, and is wound around the vibrating arm 27 in the embodiment of FIGS. 1-4. Some kind of coolant is circulated through the cooling ring 45.

The vibrating arm 27 may also support the entire assembly. For example, as shown, it may be connected to or integral with a frame 47 which in practice is the frame of the molding apparatus, for example, by means of resilient means such as resilient arms 48 arranged as transverse spokes around the vibrating arm. Each of the resilient arms 48 is anchored in a block 49 of elastic material carried by the frame 47.

The connecting body 11 may be made of a suitably cut-out simple metal plate of steel for example.

In the FIGS. 1-3 embodiment the connecting body 11 has a generally inverted T-shaped configuration with the leg connected to the vibrating arm 27 and the cross-bar extending between the injection head 12 and the mold 13. The contour of the connecting body 11 from the side face 30 to the transverse end faces 20 and 21 is, for example, circular or hyperbolic.

On the side opposite the side face 30 the contour of the connecting body 11 may have two inflection points so that the side surface intersects the transverse end faces 20, 21 substantially at right angles, which inflection points are located on either side of generally rounded middle portion which protrudes away from the side face 30.

Obviously other contours and configurations for the connecting body 11 are possible. For example, as illustrated in chain-dotted lines in FIG. 2, the connecting body 11 may have a generally cruciform configuration.

In any event heating means is preferably associated with the connecting body 11. As shown schematically in FIG. 3, the heating means comprises, for example, two infrared heating units 52 disposed laterally on opposite sides of the connecting body 11 between the injection head 12 and the mold 13. Such infrared heating units are well known per se and therefore will not be described in detail herein. They may be 500 W units for example. It follows from the foregoing that the total instantaneous power of the vibration-aided feed device may be of the order of 1-5 kW. In any event in most cases the power consumption is considerably less than 10 kW.

If desired, and as shown, a temperature sensor 53 may be mounted in the connecting body 11, for example, at the end opposite the vibrating arm 27 in order to control the heating of the connecting body and/or the injection head.

In the alternative embodiment of FIG. 4, the vibrating arm 27 is disposed generally obliquely relative to the axis of the distribution channel 25 through the connecting body 11. For example, as shown, the vibrating arm 27 is disposed at 45° relative to the connecting body axis. For its connection to the vibrating arm 27 the connecting body 11 has an oblique arm 27'. In this embodiment the end of the connecting body 11 adjacent the mold 13 is defined by an endpiece 55 which is separate from the main part of the connecting body 11 and is suitably secured thereto by, for example, threaded engagement, for extending the main part of the connecting body 11. In conjunction therewith at least part of the heating means associated with the connecting body 11 is defined by a band heater 56 embracing the endpiece 55.

In the FIG. 5 embodiment the connecting body 11 of the vibration-aided feed device 10 which defines a spacer member is inserted between two parts of the injection head 12 itself. One of these parts of the injection head 12 is the injection nozzle 17 and the other part, in this embodiment, is an adapter sleeve 60 threadedly engaging a part 61 known generally as the "pot" endpiece interposed between the injection head 12 and the body 62 of the injection press therefor. Such a pot endpiece 61 can in turn be directly threadedly engaged on the body 62 of the injection press or, as shown, secured thereto by means of half collars 63 to which it is fixed by screws 64. In any event the pot endpiece 61 is commonly used for mounting at least one temperature sensor 66 and at least one pressure sensor 67 and usually the head 69 of the screw of the injection pressure extends at least partially axially into the pot endpiece 61.

As above, these arrangements are well known per se and as they are not part of the actual invention they will not be described in greater detail herein. In the illustrated embodiment the connecting body 11 of the vibration-aided feed device 10 is threaded connected to the adapter sleeve 60 and the injection nozzle 17 between which it is inserted. Tapped recesses 70, 71 are provided at the transverse end faces 20, 21 for threaded engagement with the threaded couplings on the injection nozzles 17 and the adapter sleeve 60. Alternatively the connecting body 11 may be coupled to the injection nozzle and adapter sleeve by other means.

It is also evident that instead of mounting the connecting body 11 on the adapter sleeve 60 interposed between the adapter sleeve and the pot endpiece 61 of the injection head 12, the connecting body 11 may be secured directly on the pot endpiece 61. Moreover, according to similar arrangements, the connecting body 11 may be inserted between two parts of the mold 13 or parts connected thereto.

In the foregoing description the connecting body 11 of the vibration-aided feed device 10 is relatively rigidly connected to the parts between which it is inserted, it is proposed in the embodiment of FIGS. 6 and 7 to provide a floating mounting.

In this embodiment the connecting body 11 is floatingly mounted at least longitudinally in a housing 75 against the bias of resilient means. In this embodiment the housing 75 is part of the injection head 12 and more particularly part of the pot endpiece 61 thereof. For this purpose the pot endpiece 61 is provided with an axially extending projection 76.

The housing 75 formed by the projection 76 opens laterally through a slot 77 which permits the positioning of the connecting body 11, obviously at an angle if the length of the housing 75 is less than that of the connecting body, and which also provides a passageway necessary for the other arm 27' of the connecting body 11.

One of the transverse walls of the housing 75 is part of the projection 76 of the pot endpiece 61, and the other transverse face is part of the injection nozzle 17, which injection nozzle 17 is screwed onto the end of the projection 76. For reasons which will be brought out below one or more shims 78 of duly calibrated thickness are interposed axially between the injection nozzle 17 and the end or edge of the projection 76 of the pot endpiece 61.

Between the connecting body 11 of the vibration-aided feed device 10 and one of the transverse wall of the housing 75 in which the connecting body is accommodated, is defined a clearance H which in the rest position of the vibration generator 28 is at least equal to the amplitude of vibrations produced by the vibration generator (not shown in FIG. 6), and preferably only slightly greater than the amplitude thereof.

In the FIGS. 6, 7 embodiment the resilient means floatingly mounting the connecting body 11 in the housing 75 comprises at least a Belleville washer 80 at each end of the connecting body 11. In principle, a single Belleville washer 80 is provided at each end of the connecting body 11. According to a further feature of the invention the Belleville washers 80 together center the connecting body 11 in the housing 75.

In the FIGS. 6, 7 embodiment the connecting body 11 has at each one of its ends an axial extension 81 on which the inner periphery of the corresponding Belleville washer 80 is received while the outer periphery cooperates with the longitudinal walls of the housing 75.

Obviously the transverse end face of such an axial extension 81 which defines the corresponding transverse end face 20, 21 of the connecting body 11 is the reference surface for determining the clearance J.

In practice the two Belleville washers 80 which are symmetrical and taper in opposite directions have the same spring rate and produce the same compressive load, and they are suitably machined to the same dimensions.

In the rest position clearance J is the same at both ends of the connecting body 11.

As will be readily appreciated the shim or shims 78 disposed between the injection nozzle 17 and the end of the projection 76 of the pot endpiece 61 enable the clearance J to be adjusted to the desired optimum value.

In operation there must not be contact between the connecting body 11 and the corresponding transverse walls of the housing 75 in which it is accommodated and the molding material must not be able to leak laterally through the corresponding interstitial spaces. Experience shows that clearances of the order of 10–15 microns usually are satisfactory. It also shows that the molding material does not leak laterally when the clearances are a few microns greater than the amplitude of the vibrations. The amplitude may then be of the order of 10 microns, for example, which in any event is very much greater than that which was allowable in previous mountings.

The resulting vibration-aided device is thus improved bearing in mind, however, that it is not mandatory to utilize the greatest possible amplitude to ensure the best results for all plastics materials which may be employed. The selection of the shim or shims 78 enables the adaptation necessary.

In will be noted that the connecting body 11 of the vibration-aided feed device 10 according to the invention is thus held in the housing 75 by simple compression due to its floating mounting.

Moreover, the projection 76 of the pot endpiece 61 has the advantage of permitting the mounting of heating bands 83 in the conventional manner at the base of the projection 76 forming the pot endpiece per se and at the injection nozzle 17.

Obviously, instead of the housing 75 in which the connecting body 11 is floatingly mounted being a part of the injection head 12 it may, alternatively, be part of the mold or component fixed to the mold.

The present vibration-aided feed device is not intended to be limited to the embodiments illustrated and described herein but encompasses all alternatives and modifications and/or combinations of features as will be understood to those skilled in the art without departing from the scope of the present invention.

In particular when the connecting body of the device comprises a lateral arm, this arm may define the vibrating arm in which case the arrangement is in one-piece and the vibration generator is directly applied to the assembly.

The present invention is not intended to be limited to the numerical values which are given by way of example. In particular, the vibration generator is not necessarily an ultrasonic vibration generator, frequencies of 10 kHz or less may be suitable although for at least reasons of noise level and comfort ultrasonic frequencies are preferable.

Finally, the field of the invention is not necessarily limited to that of molding plastics materials but it may also be applicable to the casting of metals.

In any event the vibration-aided feed device advantageously operates without any substantial increase in temperature or pressure, and the energy necessary for the energization of the vibration generator is practically negligible compared with the energy requirements for the overall molding operation.

What is claimed is:

1. A vibration-aided feed device for a molding apparatus of the kind comprising an injection head and a mold, a feed channel for bringing said injection head into communication with said mold, said feed device comprising a connecting body having a distribution channel defining at least part of said feed channel, a laterally extending vibrating arm linked to said connecting body, a vibration generator coupled to said vibrating arm for imparting vibrations to said connecting body without substantially increasing temperatures in said distribution channel, and resilient means floatingly mounting said connecting body for permitting vibration thereof relative to said injection head and said mold.

2. A feed device according to claim 1, wherein said connecting body comprises another arm for linking said vibration arm to said connecting body.

3. A feed device according to claim 1, wherein said vibrating arm extends generally obliquely relative to the axis of distribution channel in said connecting body.

4. A molding apparatus comprising an injection head, a mold, a feed channel for bringing said injection head into communication with said mold and for carrying molding material to said mold, a vibration-aided feed device comprising a connecting body having a distribution channel defining at least part of said feed channel, a latterally extending vibrating arm linked to said connecting body, a vibration generator coupled to said vibrating arm, and resilient means floatingly mounting said connecting body to permit the vibration thereof relative to said mold and said injection head, whereby vibrations are imparted; to the molding material in said distribution channel for improving the flow and distribution thereof.

5. A molding apparatus according to claim 4, wherein said connecting body defines a spacer inserted between said injection head and said mold.

6. A molding apparatus according to claim 5, wherein said connecting body has a first transverse end face of particular configuration complementary to that of the corresponding one of said injection head and said mold, said connecting body having a second transverse end face which is a negative replica of said transverse end face, one of said transverse end faces being concave and the other of said transverse end faces being convex.

7. A molding apparatus according to claim 5, wherein resilient means connects said vibrating arm to a support structure.

8. A molding apparatus according to claim 5, wherein said connecting body is interposed between two parts of said injection head.

9. A molding apparatus according to claim 5, wherein said connecting body is interposed between two parts of said mold.

10. A molding apparatus according to claim 5, wherein said connecting body is interposed between said mold and a part fixed thereto.

11. A molding apparatus according to claim 5, wherein the length of said vibrating arm between said connecting body and said vibration generator is equal to a positive whole number multiple of the half-wavelength of vibrations produced by said vibration generator.

12. A molding apparatus according to claim 5, wherein cooling means is associated with said vibration arm.

13. A molding apparatus according to claim 5, wherein said connecting body comprises transverse end faces, the length of said connecting body measured between said transverse end faces is equal to a positive whole number multiple of the half-wavelength of vibrations produced by said vibration generator.

14. A molding apparatus according to claim 5, wherein said connectihg body has a half-width measured between distribution channel therethrough and said vibrating arm equal to one-quarter of the wavelength of vibrations produced by said vibration generator.

15. A molding apparatus according to claim 5, wherein the length of said vibrating arm between said connecting body and said vibration generator is equal to a positive whole number multiple of the half-wavelength of vibrations produced by said vibration generator, and wherein said connecting body has a half-width measured between distribution channel therethrough and said vibrating arm equal to one-quarter of the wavelength of vibrations produced by said vibration generator, whereby a nodal zone is formed in the middle of the distribution channel.

16. A molding apparatus according to claim 15, wherein said connecting body comprises transverse end faces, the length of said connecting body measured between said transverse end faces is equal to a positive whole number multiple of the half-wavelength of vibrations produced by said vibration generator.

17. A molding apparatus according to claim 5, wherein said vibration generator comprises a transducer adapted to produce mechanical vibrations in response to electric pulses.

18. A molding apparatus according to claim 17, wherein said transducer is an ultrasonic transducer.

19. A molding apparatus according to claim 5, wherein said connecting body is associated with heating means.

20. A molding apparatus according to claim 19, wherein at least part of said heating means surrounds an endpiece of said connecting body which is separate from and suitably secured to said connecting body.

21. A molding apparatus according to claim 4, wherein said resilient means floatingly mounts said connecting body in a housing.

22. A molding apparatus according to claim 21, wherein said housing has transverse walls, longitudinal clearance being provided between said connecting body and said transverse walls, in a rest position said longitudinal clearance being at least equal to the amplitude of vibrations produced by said vibration generator.

23. A molding apparatus according to claim 21, wherein said longitudinal clearance is slightly greater than the amplitude of vibrations produced by said vibration generator.

24. A molding apparatus according to claim 21, wherein said resilient means floatingly mounting said connecting body comprises a Belleville washer at each end of said connecting body, said Belleville washers together centering said connecting body in said housing, said connecting body having at each of its ends an axial extension on which the associated Belleville washer is received.

25. A molding apparatus according to claim 21, wherein said housing is defined in said injection head.

26. A molding apparatus according to claim 21, wherein said housing is defined in said mold.

27. A molding apparatus according to claim 21, wherein said housing is formed in a part fixed to said mold.

* * * * *